Patented Oct. 13, 1942

2,298,713

UNITED STATES PATENT OFFICE 2,298,713

METHOD OF TREATING RUBBER

James A. Merrill, Akron, Ohio, assignor to Wingfoot Corporation, Wilmington, Del., a corporation of Delaware No Drawing. Application May 27, 1938, Serial No. 210,432

8 Claims. (Cl. 260—821)

This invention relates to the treatment of rubber. More particularly, it relates to a treatment of latex whereby a non-coherent powdered rubber of particular properties and utility is obtained.

It is known that rubber may be separated from latex in the form of small flocs or particles and this phenomenon has been utilized for the preparation of rubber in powdered or granular form. According to the prior practices, however, it has been customary, in order to obtain a non-coherent dry powder, to add to the latex to be flocculated a material which subsequently served to protect the discrete rubber particles and particularly to prevent their cohesion on separation and drying. In some of the prior art practices, these added protective materials have been protective colloids, usually hydrophilic colloids, such as alkali caseinates, soaps, etc. In others, the added materials have been inorganic materials which, on addition of the flocculating agent and during the flocculation of the rubber, reacted with the flocculating agent, often with the production of substantial quantities of metathetical fillers. The latter practice is illustrated by British Patent No. 410,793. In many applications of rubber to commercial products the presence of these added materials is disadvantageous and, in certain specific applications in which it is desired that the rubber be as free as possible from the influence of moisture and water vapor, such as in electrical insulators, their presence may become a serious detriment. On the other hand, according to prior practices, flocculation of the rubber in the absence of these added materials resulted, on subsequent separation and drying, in cohesion of the rubber particles which made it practically impossible to maintain and handle the rubber in powdered form. It is, therefore, one of the objects of the present invention to prepare rubber in powdered or granular form free from added hydrophilic colloids or added inorganic materials which react with the flocculating agent, which rubber powder will, nevertheless, remain non-coherent. Further objects and advantages will be apparent as the description of the invention proceeds.

According to the invention, latex preserved with caustic may be flocculated without the addition of any such protective material by the use of an aluminum salt in quantity sufficient to render the latex acid. The rubber flocculated in this manner may then be separated from the slurry by filtration or other suitable means and dried to yield a powder which is sufficiently non-coherent to enable it to be handled and utilized without difficulty. During the flocculation, much of the non-rubber constituents is left in the serum so that the flocculated rubber contains a lower proportion of these constituents, based on the rubber, than does the original latex. For some purposes this is very desirable since, for example, some of these non-rubber constituents of the latex are water sensitive.

The latex employed may be preserved with any caustic alkali, of which sodium hydroxide and potassium hydroxide are the best known and most widely used. Such caustic preserved latex is readily prepared. For example, simple addition of a suitable quantity of potassium hydroxide, e. g. 0.5–1.0 percent, to either fresh or aged latex is satisfactory. Larger or smaller amounts of caustic may also be employed, although it is generally desirable to keep the amount small. Such latex ships and keeps well, can be concentrated by centrifuging, and subjected to other customary treatments.

The aluminum salts which may be employed are any of those salts, acidic in nature, which are recognized as having a flocculating effect on latex. The most readily available and most effective of these are aluminum chloride, aluminum sulfate, and the alums, such as potassium alum.

The following examples will serve to illustrate the practice of the invention.

Example 1

A quantity of latex amounting to 2800 cc. containing 38.8% solids and preserved with 0.96% potassium hydroxide was diluted with 2500 cc. of water. This diluted latex was then poured slowly into a solution prepared by dissolving 120 grams of 34% aluminum chloride in 6000 cc. of water. The rubber separated from the latex in floccular form. When the ingredients had been thoroughly mixed and the flocculation of the rubber was complete, the rubber was separated from the slurry by filtration, crumbled, dusted with 1% zinc stearate and then dried at 50° C. The dry rubber was a non-coherent powder which could be readily handled, even to the point of subjecting it to considerable pressure, without destroying its powder form. This powder was subsequently compounded, sheeted out on a rubber mill and vulcanized to yield a product of excellent physical properties.

Example 2

Latex was flocculated by a procedure similar to that of Example 1 but using an amount of aluminum chloride sufficient only to render the final slurry neutral. The filtrate from this slurry was slightly cloudy and the filter cake obtained was, on subsequent drying, quite sensitive to pressure so that it could not nearly so readily be broken up or maintained in granular form as the product of Example 1. The particles had a definite tendency to cohere.

Other experiments similar to the foregoing have clearly demonstrated that the final acidity of the slurry is controlling in the preparation of such rubber powders and that it is essential for the obtainment of a non-cohering powder to add a sufficient amount of the aluminum salt to render the slurry acid. It is found, however, that, although non-coherent powders are still obtained, the increasing of the final acidity beyond a certain point causes somewhat more difficult filtration of the slurry and there is, at the same time, a small loss of material which is evidenced by cloudiness in the filtrate. It is desirable, therefore, to have a final acidity corresponding to a pH of approximately 4.2 to 6.9. It is further found that the final acidity has an influence on the rate of cure of the rubber and therefore, it is preferred to have a final acidity corresponding to a pH of 5.0 to 6.0.

Rubber powders obtained by the process of the invention are customarily about 10-20 mesh in size. This is somewhat larger than the degree of subdivision possible by certain of the methods of the prior art but the powders are sufficiently small for practical use in most purposes for which rubber powders are employed, especially those for which the physical properties of the product are particularly suitable.

While the foregoing discussion points out that it is the final acidity of the slurry from which the powder is produced, which is primarily controlling, so that the invention may be practiced either by adding the flocculating agent to the latex or by adding the latex to the flocculating agent, it is in general true that by stirring the latex into the flocculating agent, thereby constantly maintaining an acid condition in the mix, it is possible to obtain a more uniform product of somewhat smaller particle size and more resistant to mechanical treatment when separated and dried to the powder form. It is, therefore, a preferred form of the invention to add the latex to the flocculating agent in such a manner that the flocculation is carried out in a medium acid throughout the process.

Many variations and modifications of the process are possible. For example, various compounding ingredients such as fillers, pigments, accelerators, antioxidants, etc. may be added before or after flocculation. Also, by suitable compounding and heat treatment it is possible to obtain vulcanized rubber powder. Other variations will suggest themselves.

Although only the preferred embodiments of the invention have been described in detail, it will be apparent to those skilled in the art that various modifications may be made therein without departing from the spirit of the invention or the scope of the appended claims in which it is intended to cover by suitable expression all features of patentable novelty residing in the invention.

What I claim is:

1. In a method of preparing a non-coherent rubber powder, the improvement which comprises adding to caustic-preserved natural latex, in the absence of added hydrophilic colloids and in the absence of added inorganic materials which react with the flocculating agent, a quantity of an aluminum salt sufficient to render the latex acid, and reducing the flocculated rubber to a dry, free-flowing non-coherent rubber powder.

2. In a method of preparing a non-coherent rubber powder, free from added hydrophilic colloids and free from metathetical fillers formed by the reaction of added inorganic materials with the flocculating agent, the steps comprising flocculating caustic-preserved natural latex with a quantity of an aluminum salt sufficient to render the latex acid, and reducing the flocculated rubber to a dry, non-coherent rubber powder.

3. In a method of preparing a non-coherent rubber powder, the improvement which comprises flocculating caustic-preserved natural latex, in the absence of added hydrophilic colloids and in the absence of added inorganic materials which react with the flocculating agent to form metathetical fillers, with an aluminum salt while maintaining the mixture in acid condition, forming a crumbly cake of the flocculated rubber, crumbling this cake to powder, and drying the powder.

4. In a method of preparing a non-coherent rubber powder, the improvement which comprises flocculating caustic-preserved natural latex, in the absence of added hydrophilic colloids and in the absence of metathetical fillers formed by the reaction of added inorganic materials with the flocculating agent, with an aluminum salt to obtain a final acidity in the slurry corresponding to a pH of 4.2 to 6.9, forming a crumbly cake of the flocculated rubber, crumbling this cake to powder, and drying the powder.

5. In a method of preparing a non-coherent rubber powder, the improvement which comprises flocculating caustic-preserved natural latex, in the absence of added hydrophilic colloids and in the absence of metathetical fillers formed by the reaction of added inorganic materials with the flocculating agent, with a quantity of aluminum chloride sufficient to produce, in the slurry, a final acidity corresponding to a pH of less than 7, forming a crumbly cake of the flocculated rubber, crumbling this cake to powder and drying the powder.

6. In a method of preparing a non-coherent rubber powder, the improvement which comprises flocculating caustic-preserved natural latex, in the absence of added hydrophilic colloids and in the absence of metathetical fillers formed by the reaction of added inorganic materials with the flocculating agent, with an aluminum salt to obtain a final acidity in the slurry corresponding to a pH of 5.0 to 6.0, forming a crumbly cake of the flocculated rubber, crumbling this cake to powder, and drying the powder.

7. A free-flowing, non-coherent powder derived from flocculated natural latex, which powder is free from added hydrophilic colloids and metathetical fillers formed by the reaction of added inorganic materials with the flocculating agent and which has a lower proportion of latex non-rubber constituents than the original latex.

8. A free-flowing, non-coherent rubber powder, which powder is free from added hydrophilic colloids and metathetical fillers formed by the reaction of added inorganic materials with the flocculating agent, which has a lower proportion of latex non-rubber constituents than the original latex and which is prepared by adding to a caustic-preserved natural latex a quantity of an aluminum salt sufficient to render the latex acid.

JAMES A. MERRILL.